G. W. BRADLEY.
Device for Filling Veneer Boxes with Butter.
No. 212,651. Patented Feb. 25, 1879.
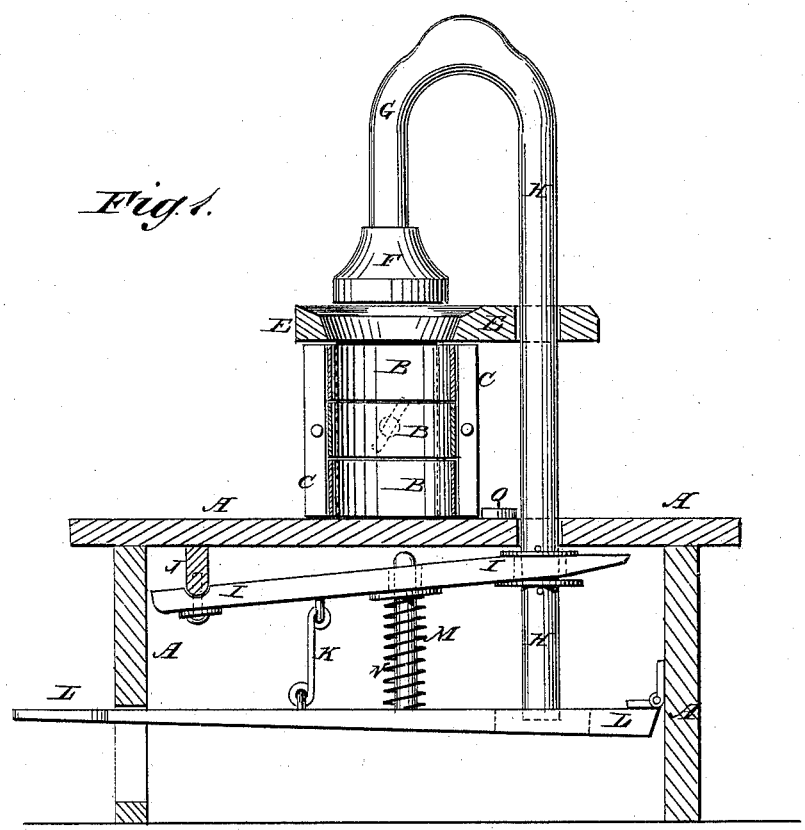
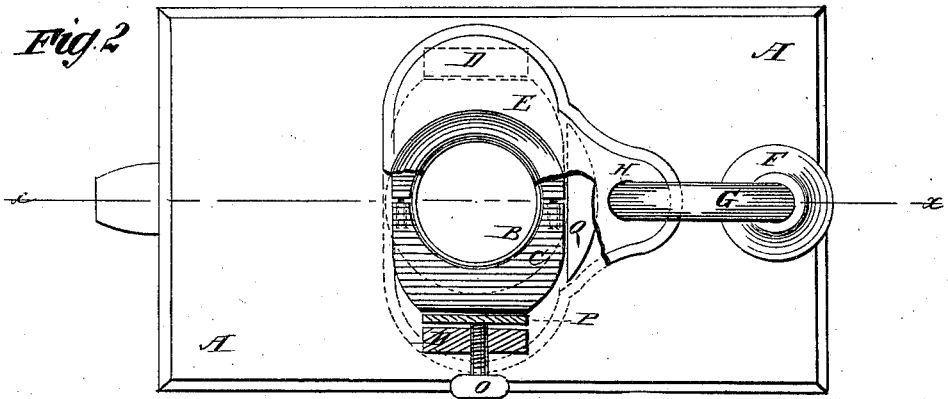
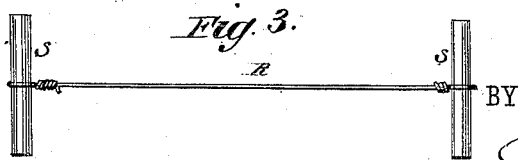
WITNESSES:
F. McArdle
C. Sedgwick
INVENTOR:
G. W. Bradley
BY Munn & Co
ATTORNEYS.

UNITED STATES PATENT OFFICE.

GILBERT W. BRADLEY, OF SUNDERLAND, VERMONT.

IMPROVEMENT IN DEVICES FOR FILLING VENEER BOXES WITH BUTTER.

Specification forming part of Letters Patent No. 212,651, dated February 25, 1879; application filed January 16, 1879.

*To all whom it may concern:*

Be it known that I, GILBERT W. BRADLEY, of Sunderland, in the county of Bennington and State of Vermont, have invented a new and useful Improvement in Devices for Filling Veneer Boxes with Butter, of which the following is a specification:

Figure 1 is a vertical section of my improved device, taken through the line $xx$, Fig. 2. Fig. 2 is a top view of the same, partly in horizontal section, to show the construction. Fig. 3 represents the wire for separating the boxes.

Similar letters of reference indicate corresponding parts.

The object of this invention is to furnish an improved device for filling veneer boxes with butter, which shall be simple in construction and convenient in use, and which will pack the butter closely and rapidly.

The invention consists in the combination of the holder, made in two parts, the follower, arm, and upright, the lever, the connecting-rod, the treadle, and the spring with each other, with the box, table, or frame, and with the uprights and cross-board, attached to the said box, table, or frame, as hereinafter fully described.

A represents a box, table, or frame, to which the device is attached. B represents a number of veneer boxes, placed one on top of the other, and which are kept in place and supported against the outward pressure of the butter while being filled by a holder or form, C, in which they are placed, and the cavity of which must be of the same shape and size as the boxes B, whether the said boxes be round or square, large or small.

The holder C is made in two parts, so that the filled boxes may be readily removed from it, and which parts are centered upon each other by dowel-pins attached to their adjacent edges.

The sides of the holder C are flattened to fit between two uprights, D, the lower ends of which are attached to the box, table, or frame A, and their upper ends are connected by a cross-board, E. The cross-board E has a tapering or hopper-shaped hole formed through it, corresponding in shape and size at its lower or smaller end with the cavity of the boxes B to be filled, so that the butter can be conveniently forced into the said boxes.

F is the follower, by means of which the butter is forced into and closely packed in the boxes B. The follower F is made of wood, and of the same shape, but smaller, than the boxes B.

The follower F is attached to the end of an arm, G, which projects upward and rearward, and is formed upon or attached to the upper end of the upright H. The upright H passes down through a guide-hole in the rear part of the cross-board E, and through a guide-hole in the top of the box, table, or frame A.

To the lower part of the upright H is attached a grooved collar or cross-pin, or other device, to receive the slotted or perforated rear end of the lever I, the forward end of which is pivoted or hinged to a cross-bar, J, or other support, attached to the box, table, or frame A.

To the forward part of the lever I is pivoted the upper end of a connecting-rod, K, the lower end of which is pivoted to the foot-lever or treadle L. The rear end of the treadle L is hinged to the rear part of the box, table, or frame A, and its forward end projects into such a position that it may be conveniently reached and operated by the workman with his foot.

The rear part of the treadle L is slotted for the lower end of the upright H to pass through when drawn downward.

M is a spiral spring, interposed between the levers I L to raise the lever I, upright H, and follower F when drawn down by pressure applied to the treadle L.

The spring M is placed upon a guided pin, N, attached to one of the levers I L, and passing through a guide-hole in the other lever.

The holder C and its inclosed boxes B are secured in place while the said boxes are being filled by a hand or crank screw, O, which passes through a screw-hole in the upright D, or in a nut secured in the said upright.

The forward end of the screw O rests against a plate, P, and presses the said plate against the flattened end of the holder C, clamping it securely in place.

If desired, the plate P may be omitted and a small plate attached to the end of the holder C for the end of the screw to rest against.

With this construction, the butter is placed in the hopper of the cross-board E, and is worked down into and packed closely in the boxes B by the downward movement of the follower F, the said follower being gently moved from side to side as it is operated.

Q is a block or cleat attached to the box, table, or frame A, to stop the holder when it has been pushed back into a position concentric with the hole through the cross-board E. When the filled boxes B have been removed from the holder C they are separated by a fine wire, R, drawn between their adjacent edges, and which has handles S attached to its ends for convenience in working it.

Having thus described my invention, I claim as new and desire to secure by Letters Patent—

The combination of the holder C, made in two parts, the follower, arm, and upright F G H, the lever I, the connecting-rod K, the treadle L, and the spring M with each other, with the box, table, or frame A, and with the uprights and cross-board D E, attached to the said box, table, or frame, substantially as herein shown and described.

GILBERT W. BRADLEY.

Witnesses:
W. P. BLACK,
LOVELAND MUNSON.